US010208642B2

(12) United States Patent
Zhang

(10) Patent No.: US 10,208,642 B2
(45) Date of Patent: Feb. 19, 2019

(54) SYSTEMS AND METHODS FOR A SOOT SENSOR

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 15/141,120

(22) Filed: Apr. 28, 2016

(65) Prior Publication Data
US 2017/0314447 A1    Nov. 2, 2017

(51) Int. Cl.
| | |
|---|---|
| F01N 3/00 | (2006.01) |
| F01N 3/02 | (2006.01) |
| F01N 11/00 | (2006.01) |
| F01N 3/021 | (2006.01) |
| F01N 5/04 | (2006.01) |
| F01N 13/00 | (2010.01) |
| F01N 9/00 | (2006.01) |

(52) U.S. Cl.
CPC ............ *F01N 11/00* (2013.01); *F01N 3/0214* (2013.01); *F01N 3/0215* (2013.01); *F01N 5/04* (2013.01); *F01N 13/008* (2013.01); *F01N 9/002* (2013.01); *F01N 2390/00* (2013.01); *F01N 2410/00* (2013.01); *F01N 2550/04* (2013.01); *F01N 2560/05* (2013.01); *F01N 2900/1402* (2013.01); *F01N 2900/1411* (2013.01)

(58) Field of Classification Search
CPC .... F01N 11/00; F01N 13/008; F01N 2390/00; F01N 2410/00; F01N 2550/04; F01N 2560/05; F01N 2900/1402; F01N 2900/1411; F01N 3/0214; F01N 3/0215; F01N 5/04; F01N 9/002
See application file for complete search history.

(56) References Cited

U.S. PATENT DOCUMENTS

| | | | | |
|---|---|---|---|---|
| 5,013,340 | A * | 5/1991 | Taslim ................. | F01N 3/0214 55/290 |
| 5,396,764 | A * | 3/1995 | Rao ....................... | F01N 3/0835 60/274 |
| 8,800,270 | B2 * | 8/2014 | Bailey .................... | F01N 3/031 60/274 |
| 2010/0132339 | A1 * | 6/2010 | Barkhage ............... | F01N 3/023 60/287 |

OTHER PUBLICATIONS

Zhang, Xiaogang, "SCR Device," U.S. Appl. No. 15/091,001, filed Apr. 5, 2016, 40 pages.

* cited by examiner

*Primary Examiner* — Thai Ba Trieu
*Assistant Examiner* — Diem Tran
(74) *Attorney, Agent, or Firm* — Julia Voutyras; McCoy Russell LLP

(57) ABSTRACT

Methods and systems are provided for a soot sensor. In one example, a method diverting exhaust gas from a main exhaust passage to a second exhaust passage comprising a soot sensor with a rotatable component configurable to capture soot.

16 Claims, 7 Drawing Sheets

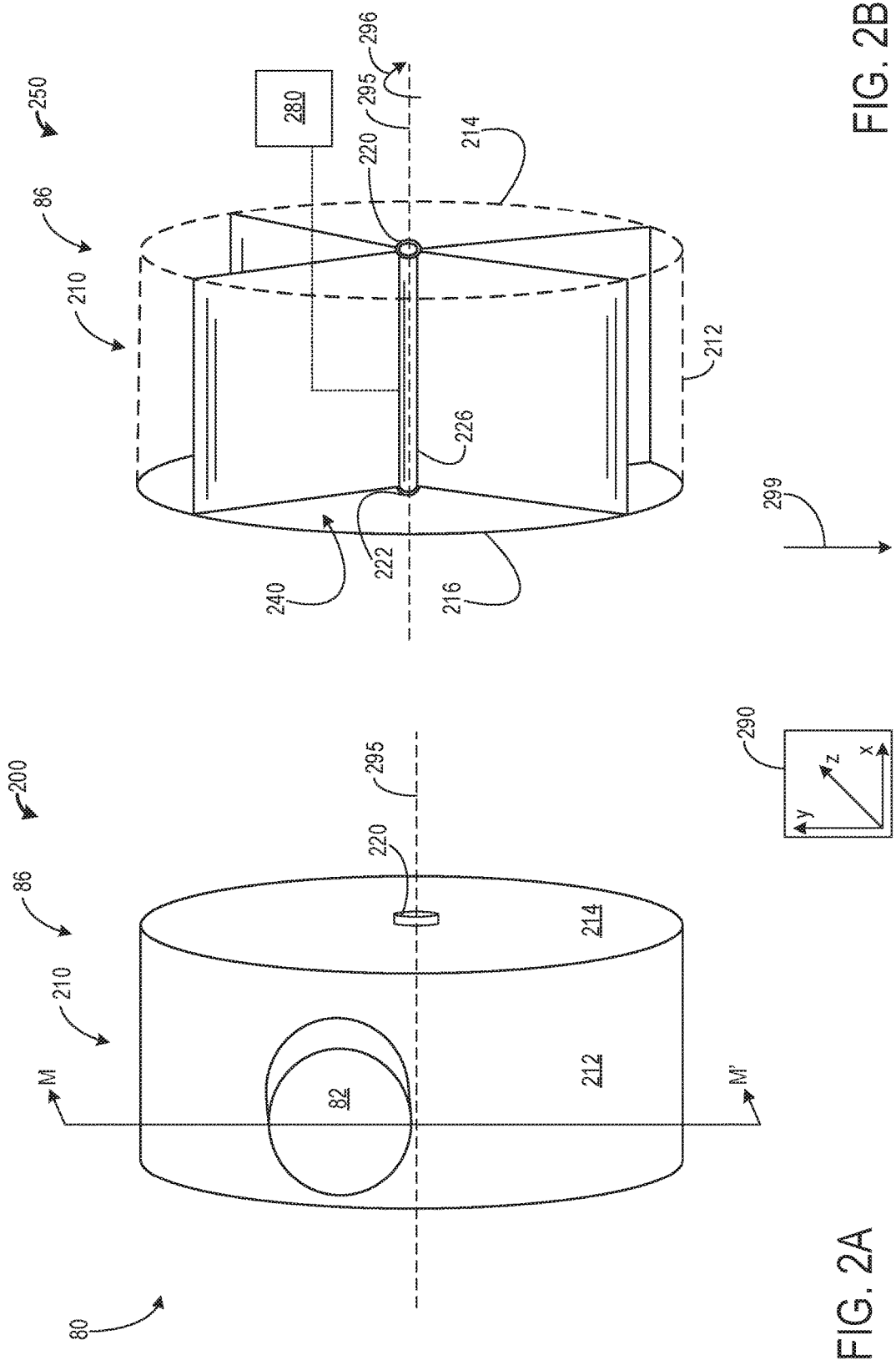

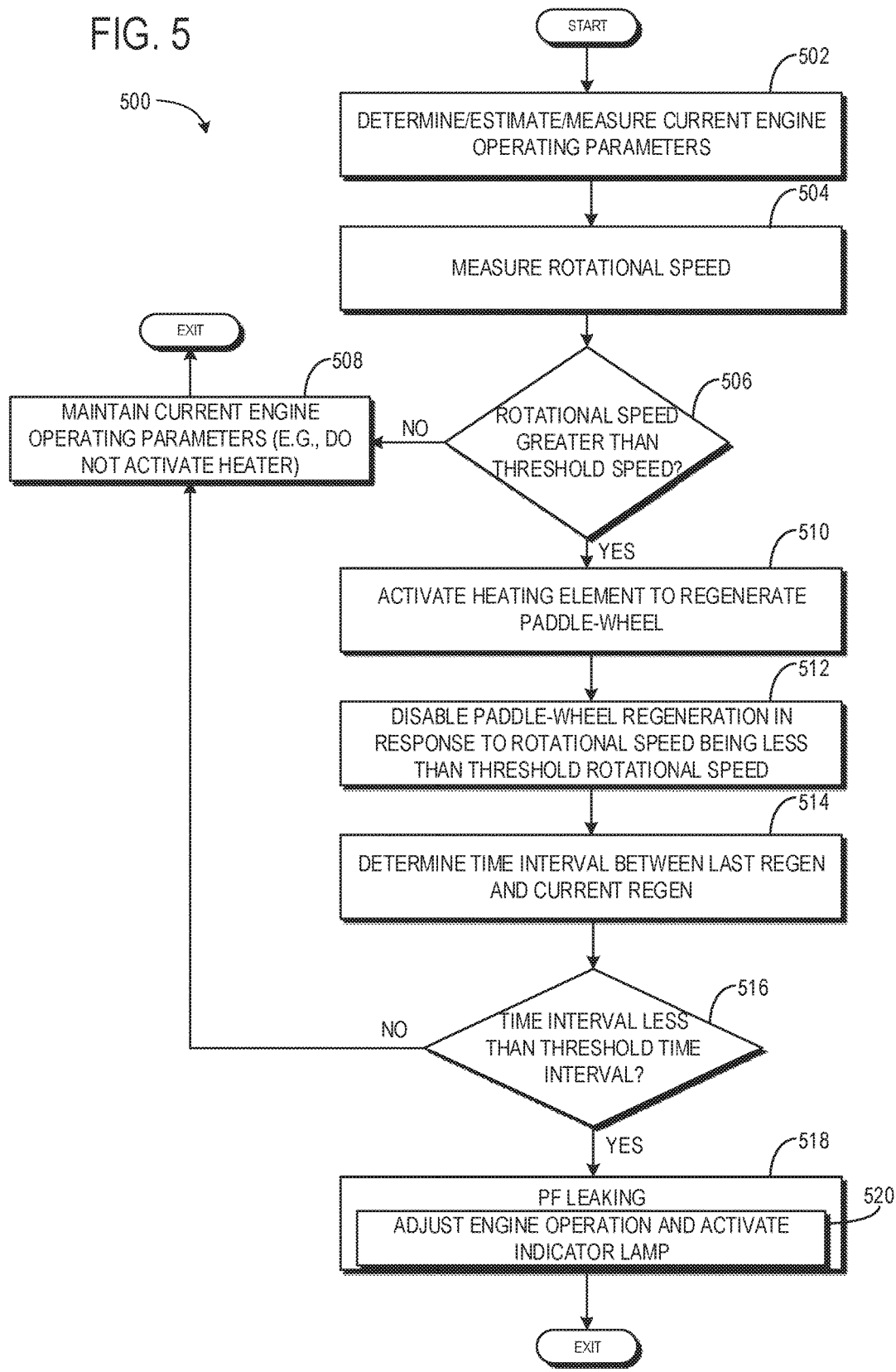

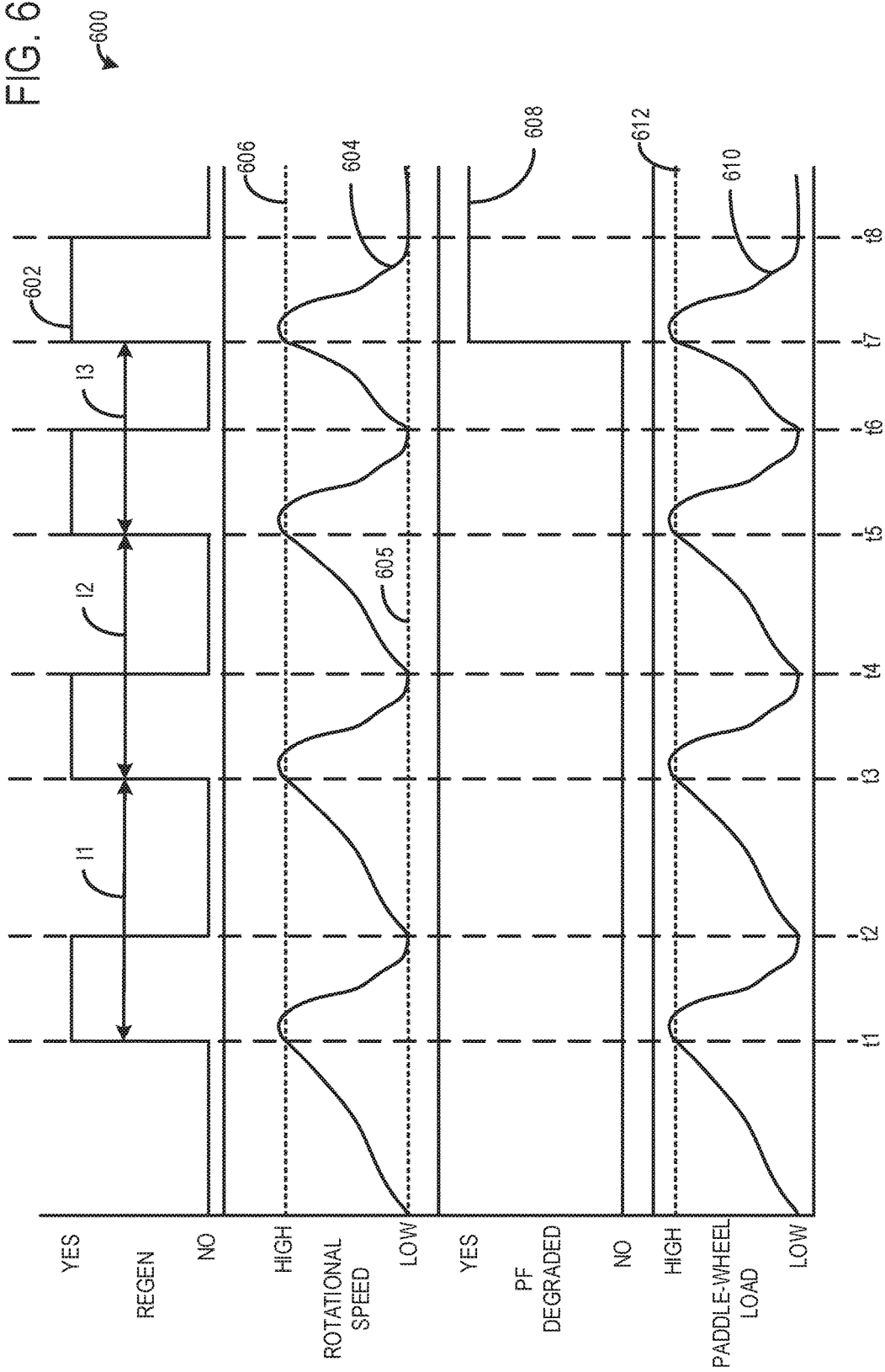

SYSTEMS AND METHODS FOR A SOOT SENSOR

FIELD

The present description relates generally to a sensor for detecting a condition of a particulate filter (PF).

BACKGROUND/SUMMARY

Particulate matter filters are increasingly used in automotive emissions systems for reducing particulate concentrations in engine exhaust. When soot accumulates to a threshold level on the particulate filter, a filter regeneration process may be used to burn off the accumulated soot under controlled engine operating conditions. However, over time, such particulates filters can suffer irreversible decreases in trapping efficiencies as the filter degrades (cracks, for example) due to uncontrolled temperature excursion during the filter regeneration process. Losses in trapping efficiency of the particulate filter may result in increased particulate matter emissions well above the regulated limit.

Increasingly stringent particulate matter emissions standards and proposed government-mandated on-board diagnostic (OBD) requirements for monitoring the trapping efficiency of a particulate filter have stimulated much research into new techniques for monitoring particulate filter performance. One method includes determining a pressure differential across a particulate filter. If the pressure differential is less than a threshold pressure differential, then the particulate filter may be leaking. However, this method may not be suitable for detecting a degradation of the filter due to interference effects from ash loading on the filter. Other methods to determine particulate filter leakage include utilizing a soot sensor, located downstream of a particulate filter, to monitor a soot load in exhaust flow and signaling when the soot load exceeds a soot threshold (e.g., the soot threshold may be based on a threshold amount of acceptable soot leakage based on particulate matter emissions). These sensors utilize spatially separated electrodes, which may become electrically connected in response to the soot load exceeding the soot threshold.

However, the inventors herein have recognized potential issues with such systems. As one example, the soot sensor may have low sensitivity to leaked soot due to a relatively small portion of soot being deposited across the electrodes. This may be due to an exhaust pipe geometry and/or poor mixing of soot with the exhaust gas. Furthermore, large diesel particulates and/or water droplets may impinge onto surfaces of the soot sensor, altering the soot sensor reading. Additionally, sensor may have poor repeatability due to erratic exhaust gas flow across the surface of the electrodes. Sensors may also redirect exhaust gas, which may result in a flow rate change across the surface of the electrodes. Both factors may lead to portions of the sensor receiving a greater amount of soot than others. Furthermore, soot sensors may comprise a guide plate for uniformly flowing exhaust gas across a surface of the electrodes. However, the guide plates may introduce packaging restraints and increased manufacturing costs.

In one example, the issues described above may be addressed by a method diverting exhaust gas from an exhaust pipe to a parallel exhaust pathway outside the exhaust pipe, where the exhaust pathway includes rotatable plates coupled to a filtering material in a fixed housing. The method further includes adjusting engine operation based on a rotational speed of the plates. In this way, compensation for particulate filter operation in the exhaust pipe may be controlled with or without electrodes.

As one example, the plates may be configured similar to a paddle-wheel in shape and structure, where the plates rotate as exhaust gas flows through the housing. The filtering material coupleable to the plates is configured to capture soot from the exhaust gas. As the soot accumulates, the plates may rotate faster for a given engine load (e.g., plates with more accumulated soot rotate faster than plates with less soot during identical engine operating conditions), which may indicate that the particulate filter in the exhaust pipe is fully loaded with soot. This indication may signal a regeneration of the particulate filter. As the number of regenerations of the particulate filter increases, the particulate filter may become degraded, which may decrease an ability of the particulate filter to capture soot. As a result, more soot may flow through the particulate filter to the soot sensor, where the plates may become loaded with soot more rapidly than when the particulate filter is not degraded. As such, degradation of the particulate filter in the exhaust conduit may be indicated once a time interval between subsequent regenerations of the filter plates decreases to a time interval less than a threshold time interval.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A and 2B show external and internal views of a soot sensor in the secondary exhaust assembly.

FIGS. 2-4 are shown approximately to scale, however, other relative dimensions may be used.

FIG. 5 shows a method for determining degradation of a particulate filter in the exhaust pipe.

FIG. 6 shows an operating sequence for monitoring a time interval between regenerations of a particulate filter in the secondary exhaust assembly.

DETAILED DESCRIPTION

Figure 1:
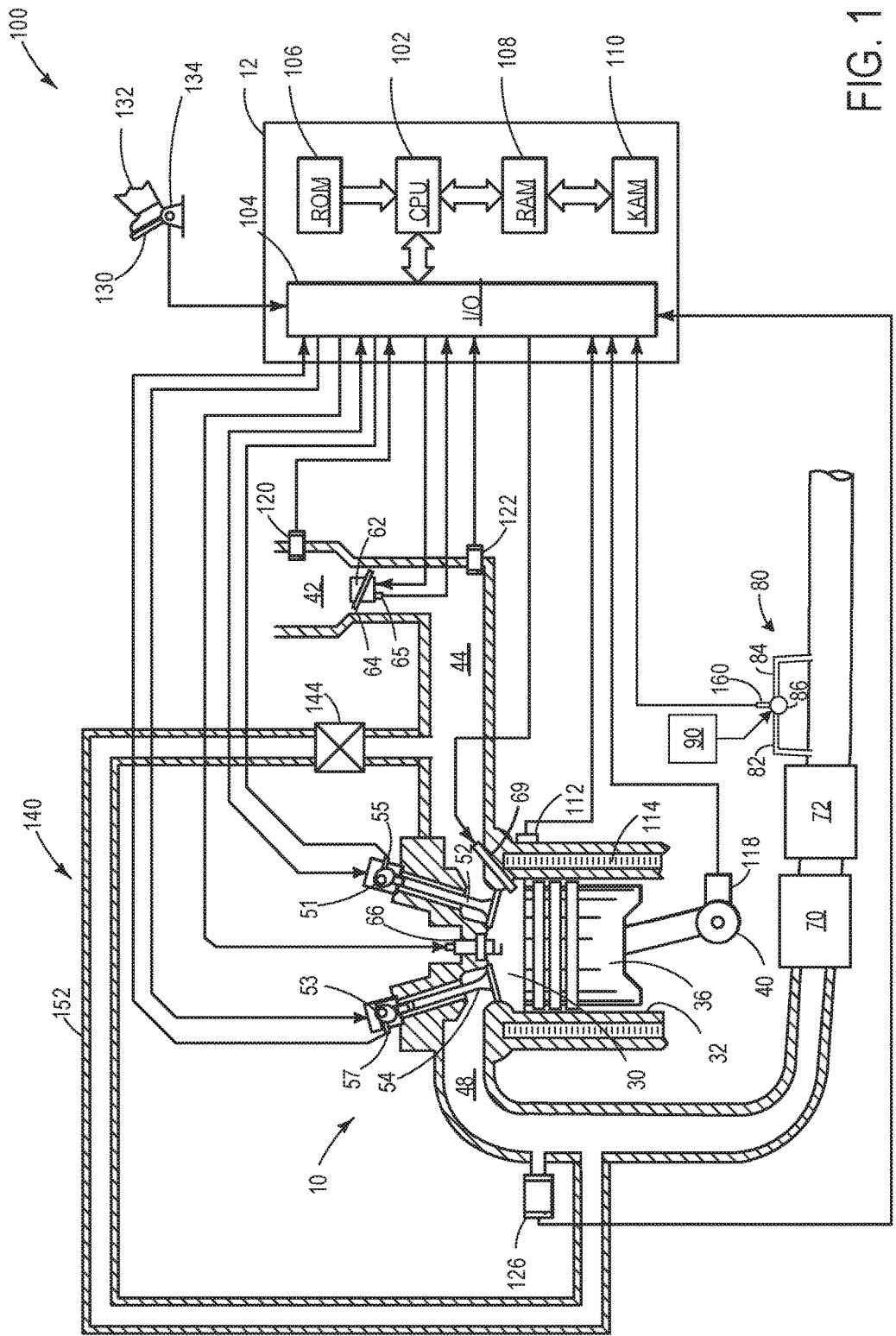
FIG. 1 shows an engine with a cylinder.
Figure 3A:
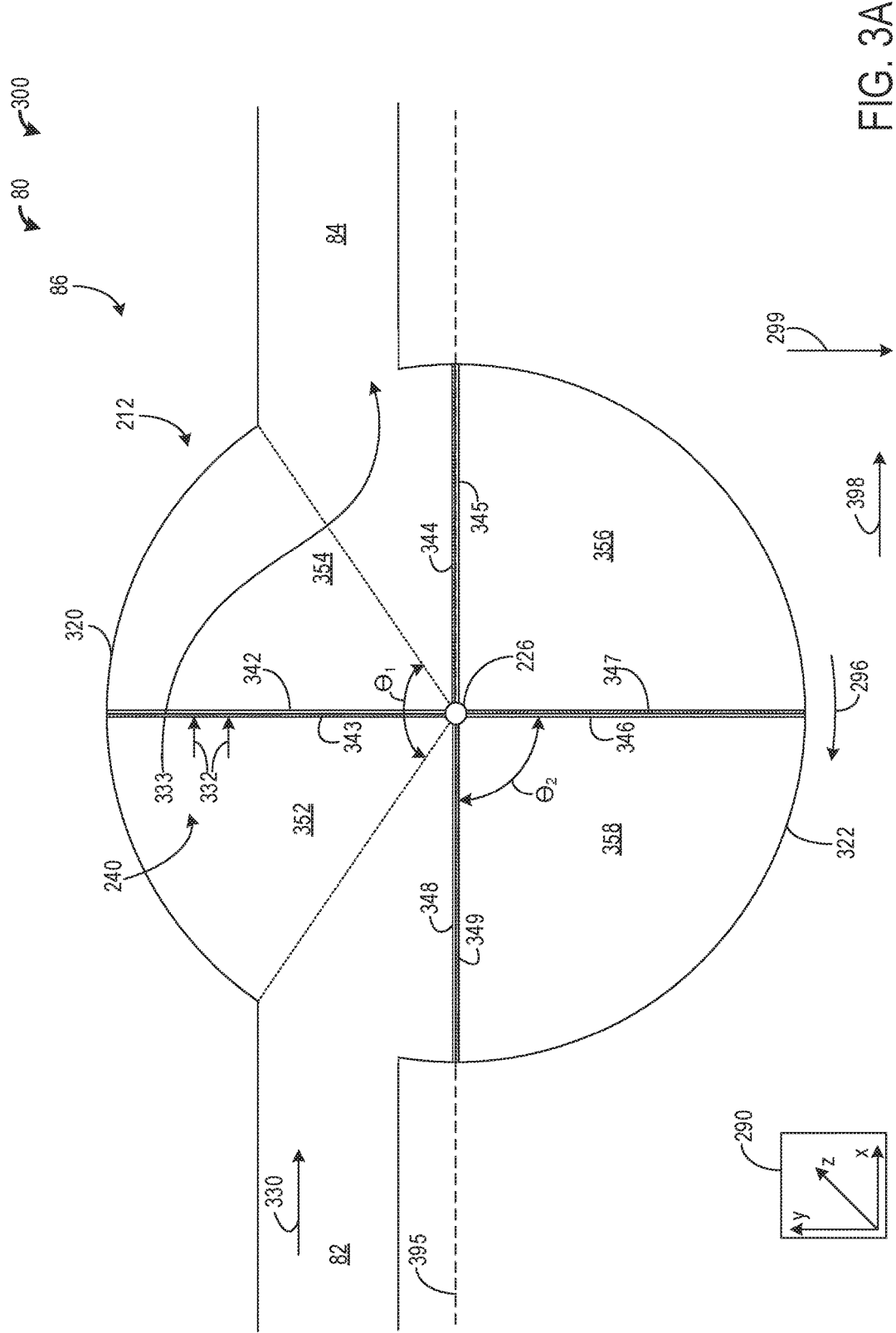
FIGS. 3A and 3B show cross-sectional views of different rotational positions of a paddle-wheel of the soot sensor in the secondary exhaust assembly.
Figure 3B:
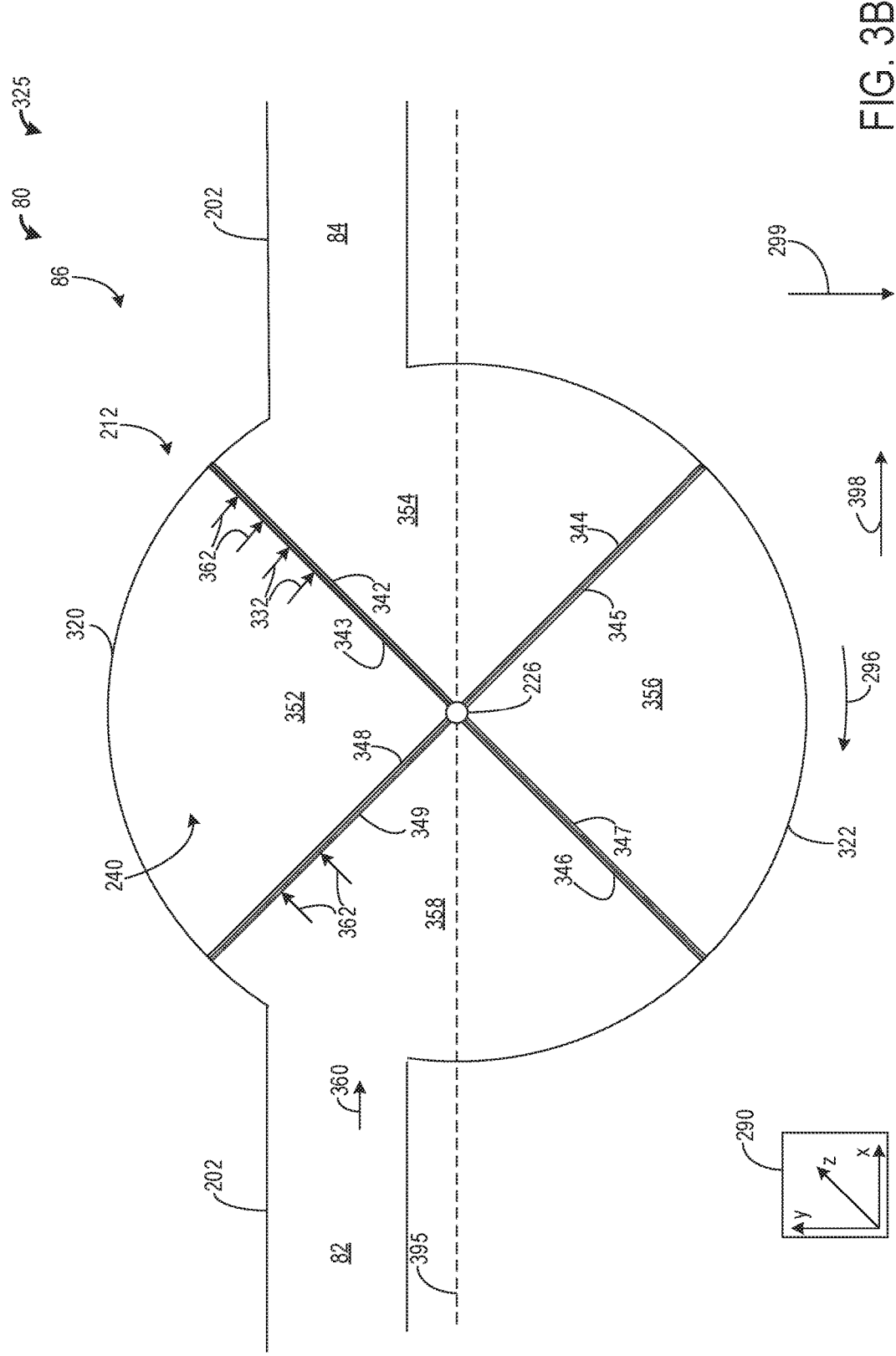
Figure 4:
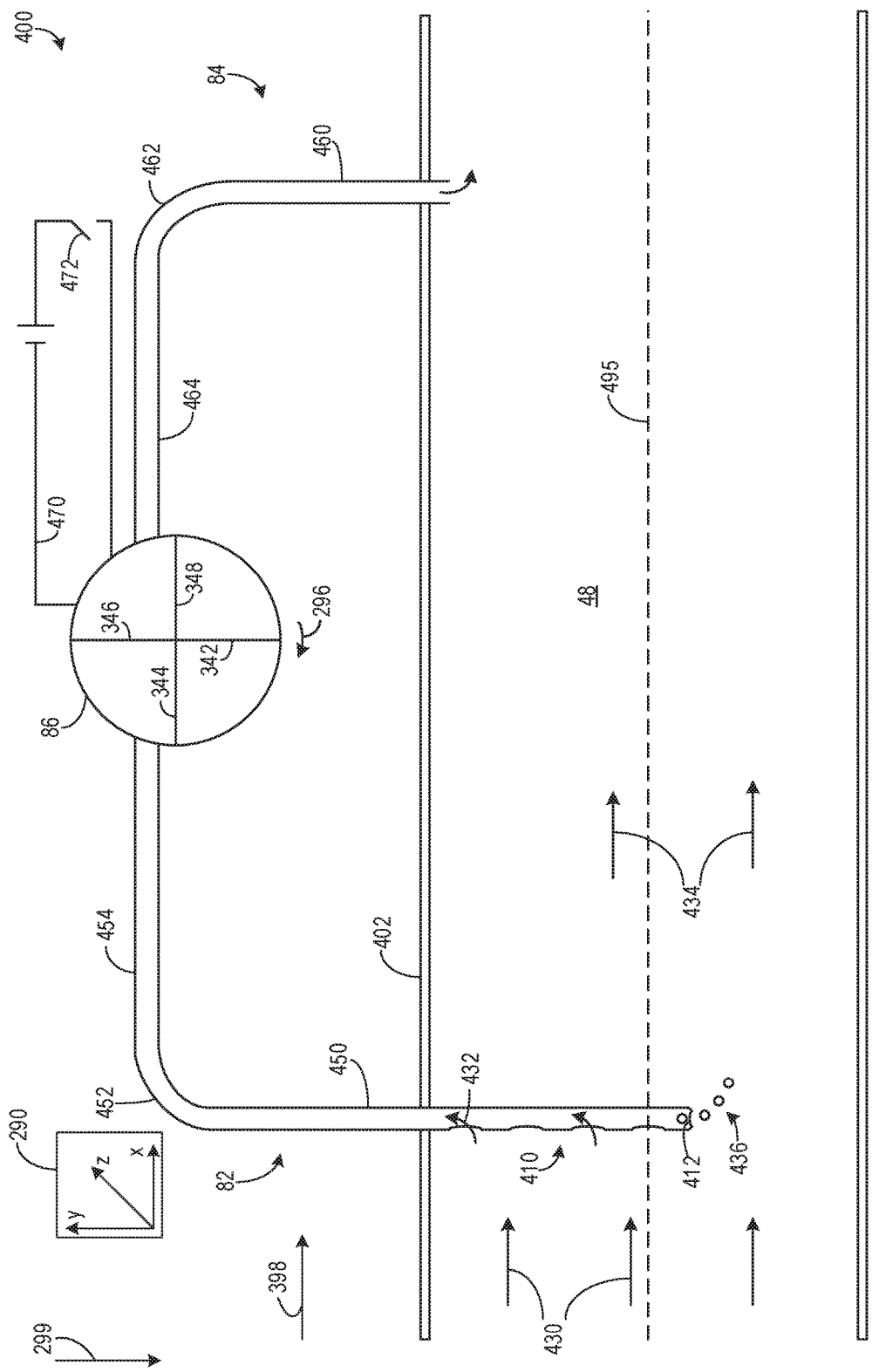
FIG. 4 shows a secondary exhaust assembly fluidly coupled to an exhaust pipe of the engine.

The following description relates to systems and methods for controlling engine operation and/or determining degradation of an engine particulate filter in an exhaust pipe. Engine adjustments and/or degradation may be determined by delivering exhaust gas to a soot sensor in a second exhaust assembly fluidly coupled to the exhaust pipe. The sensor may be in an exhaust pipe and thereby may receive exhaust gas from one or more cylinders of an engine. The exhaust gas may comprise particulate matter (PM), also referred to herein as soot, which may be captured by a particulate filter (PF), as shown in FIG. 1. The PF may become fully loaded as PM accumulates onto it, which may reduce an ability of the PF to capture soot. As such, the PF may leak, where a portion of the uncaptured PM flows to an ambient atmosphere. The soot sensor may comprise a rotatable paddle-wheel configurable to capture some of the leaked PM, as shown in FIGS. 2A and 2B. Side-on cross-sectional views of the soot sensor are shown in FIGS. 3A and 3B. An exhaust flow assembly may comprise at least one inlet and one outlet inserted in the exhaust pipe, as shown in FIG. 4. A rotational speed of the plates increases as the plates capture more PM. As such, if the rotational speed of the plates surpasses a threshold speed, then the particulate filter in the exhaust passage may be fully loaded. A method for monitoring when the rotational speed of the plates surpasses the threshold speed along with adjustments in engine operation is shown in FIG. 5. The method further depicts instructions measuring a time interval between subsequent regenerations of the particulate filter in the exhaust pipe. If the time interval is less than a threshold time interval, then the method may flag a degradation of the particulate filter in the exhaust pipe. FIG. 6 shows an engine operating sequence illustrating altering engine parameters against time.

FIGS. 2-4 show example configurations with relative positioning of the various components. If shown directly contacting each other, or directly coupled, then such elements may be referred to as directly contacting or directly coupled, respectively, at least in one example. Elements described as directly downstream or directly upstream of one another may be defined herein such that there are no intervening components between the two comparative elements. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Returning to FIG. 1, a schematic diagram showing one cylinder of a multi-cylinder engine 10 in an engine system 100, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 includes a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage (e.g., exhaust pipe) 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector 69 may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of both an exhaust gas recirculation system 140 and an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The emission control device 70 is shown arranged along the exhaust passage 48 downstream of the exhaust gas sensor 126. The device 70 may be a three way catalyst (TWC), $NO_x$ trap, various other emission control devices, or combinations thereof. In some examples, during operation of the engine 10, the emission control device 70 may be periodically reset by operating at least one cylinder of the engine within a particular air-fuel ratio.

A particulate filter (PF) 72 is shown arranged along the exhaust passage 48 downstream of the emission control device 70. The PF 72 may be a diesel particulate filter or a gasoline particulate filter. The PF 72 may be comprised of a combination of one or more of ceramic, silicon, metal, and other filtering devices configured to capture soot and other particulates in exhaust gas. During operation of the engine 10, PF 72 may capture soot (e.g., unburned hydrocarbons) to reduce vehicle emissions. The soot may accumulate onto surfaces of the PF 72, which may lead to increased exhaust backpressure. The exhaust backpressure may negatively influence the engine by impeding exhaust flow through the exhaust passage 48. Once the particulate filter 72 becomes fully loaded with soot (e.g., soot load on the particulate filter exceeds a soot load threshold), the backpressure may be too high for proper engine exhaust expulsion. An in-cylinder pressure may be increased (e.g., engine work may be increased) via adjusting a combination of one or more spark timing, fuel injection pressure, air/fuel ratio, etc. to overcome the above described backpressure, which may lead to reduced fuel economy. To avoid high backpressure, the PF 72 may be regenerated either passively or actively.

Passive regeneration may occur when an engine load exceeds a threshold load causing an exhaust temperature to rise. Soot on the PF 72 may burn off in response to an exhaust temperature increasing above a threshold temperature (e.g., 450° C.) without engine operation adjustments related to the PF 72. Therefore, passive regeneration may occur without adjustments to engine operations. Conversely, active regeneration occurs via the controller 12 signaling for alterations to engine operations to increase exhaust temperatures (e.g., late injection, secondary injection, throttling, spark retard, and/or decrease air/fuel ratio) independent of the engine load. Active regeneration may be terminated in response to the PF 72 no longer being fully loaded or in response to meeting a driver demand (e.g., tip-in).

As the soot burns during either passive or active regenerations, the particulate filter temperature increases to a high temperature (e.g., 1400° C.). The regeneration temperature may be difficult to control and ultimately degrade the PF 72. Degradation may include the PF 72 developing a leak (e.g., crack) and/or a hole, which may cause more soot to flow downstream in the exhaust passage 48, passed the PF 72, increasing vehicle emissions.

Other factors contributing to particulate filter degradation include vehicle vibrations and lubricating oil ash. Vehicle vibrations may degrade fragile components within the PF 72 due to expansion of the components (i.e., decreased stability) caused by exposure of the PF 72 to extreme temperature cycles (e.g., 1400° C. burn temperature to ambient temperature at vehicle shut-off). Lubricating oil ash may contain metal oxides which can react with the PF 72 and form phases (e.g., portions of the particulate filter are degraded while other portions remain functional), ultimately degrading at least a portion of the particulate filter.

A secondary flow assembly 80 is shown arranged along the exhaust passage 48 downstream of the PF 72. The secondary flow assembly 80 comprises an inlet 82 positioned within the exhaust passage 48, at an end of the secondary flow assembly 80 nearest the PF 72. The secondary flow assembly 80 further comprises an outlet 84 positioned within the exhaust passage 48, at an opposite end of the secondary flow assembly 80 farthest away from the PF 72. The inlet 82 and outlet 84 are fluidly coupled to a soot sensor 86 located between the inlet 82 and outlet 84. The soot sensor 86 is configured to capture soot in the exhaust gas diverted away from the exhaust passage 48 to the secondary flow assembly 80. The soot captured by the soot sensor 86 is soot that has flowed through the PF 72, in one example. As such, the soot sensor 86 may capture more soot when the PF 72 is compromised (e.g., degraded or fully loaded with soot). The soot sensor 86 may become fully loaded with soot, in which a heating element 90 may be activated to heat the soot sensor 86. The soot sensor 86 may be determined to be fully loaded when a rotational speed, measured by a rotational speed sensor 160, exceeds a threshold rotational speed. Additionally, the soot sensor 86 being fully loaded may indicate a status of PF 72, as is described below.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller 12. In one example, the controller 12 alters an engine operation to limit torque output of a vehicle in response to a signal received from the soot sensor 86 of the secondary flow assembly 80. In another example, the controller 12 activates the heating element 90 in response to the soot sensor 86 being fully loaded.

As will be appreciated by someone skilled in the art in view of this disclosure, the specific routines described below in the flowcharts may represent one or more of any number of processing strategies such as event driven, interrupt-driven, multi-tasking, multi-threading, and the like. As such, various acts or functions illustrated may be performed in the sequence illustrated, in parallel, or in some cases omitted. Like, the order of processing is not necessarily required to achieve the features and advantages, but is provided for ease of illustration and description. Although not explicitly illustrated, one or more of the illustrated acts or functions may be repeatedly performed depending on the particular strategy being used. Further, these Figures graphically represent code to be programmed into the computer readable storage medium in controller 12 to be carried out by the controller in combination with the engine hardware, as illustrated in FIG. 1.

FIG. 2A shows an exterior side perspective view 200 of soot sensor 86 incorporated in secondary flow assembly 80. FIG. 2B shows an interior side perspective view 250 of the soot sensor 86. Specifically, FIG. 2B shows the same side perspective view of soot sensor 86 shown in FIG. 2A, except that in FIG. 2B, portions of the soot sensor 86 are transparent, exposing an interior of the soot sensor 86. FIGS. 2A and 2B may therefore be described together in the description herein.

An axis system 290 is shown comprising three axes, namely, an x-axis parallel to the horizontal direction, a y-axis parallel to the vertical direction, and a z-axis perpendicular to the x- and y-axes. The axis system 290 may be used to describe the relative positioning of components of the secondary flow assembly 80. A "height" of the secondary flow assembly 80 and/or its components may be used to define the extent of the components along the y-axis. Similarly, a "length" of components of the secondary flow assembly 80 may be used to refer to the physical extent of the components along the x-axis. The physical extent of components along the z-axis may be referred to as a "width." Cutting plane M-M' defines the cross-sectional view of the secondary flow assembly 80 shown in FIGS. 3A and 3B.

The soot sensor 86 may include an outer body 210 comprising a curved surface 212 located between a first circular surface 214 and a second circular surface. The curved surface 212, first surface 214, and second surface are contiguous in one example. The second surface is occluded in the view 200 by the curved surface 212 and the first surface 214. The second surface is substantially identical to the first surface 214, where both surfaces comprise identical radii. The first surface 214 and the second surface are opposite one another about the curved surface 212. The first 214 and second surfaces are parallel to one another and physically coupled to opposite circumferential edges of the curved surface 212. In this way, the outer body 210 is a cylinder in one example. The outer body 210 may be other suitable shapes, for example, frustoconical. Thus, a cross-section of curved surface 212 is circular along a plane defined by the y- and z-axes (or parallel to the cutting plane M-M', for example) in the horizontal direction along the x-axis (according to the direction of gravity shown by arrow 299). In one example, the cross-section of the curved surface 212 taken parallel to the cutting plane M-M' is substantially identical to any other cross-section of the curved surface 212 parallel to the cutting plane M-M'.

The outer body 210 may be comprised of suitable materials, such as, plastic, metal, metal alloys, etc. The surfaces of the outer body 210 (e.g., the curved surface 212, first surface 214, and second surface) may be physically coupled to one another via welds, fusions, adhesives, or other suitable coupling elements. The outer body 210 may define a hollow interior of the soot sensor 86. Thus, exhaust gas may flow from the soot sensor 86 of the second exhaust assembly 80 to a primary exhaust passage (e.g., exhaust passage 48), where the exhaust gas in the primary exhaust passage may flow out of a tailpipe to an ambient atmosphere. However, exhaust gas may not flow directly from the secondary flow assembly 80 to the ambient atmosphere in one example. As such, the surfaces of the outer body 210 are hermetically sealed with one another and impervious to exhaust gas flow. Said another way, exhaust gas may enter and/or exit the soot sensor 86 only via the inlet 82 and outlet, respectively, in one example.

Exhaust gas entering the soot sensor 86 may rotate a rotatable device in an interior of the soot sensor 86. As such, the soot sensor 86 may include a first bushing 220 located on the first surface 214 and a second bushing located on the second surface directly opposite the first bushing 220, where the bushings are configured to couple to the rotatable device. The first bushing 220 protrudes through an opening of the first surface 214 and may be in sealing contact with the opening such that exhaust gas does not flow through an interface between the first surface 214 and the first bushing 220 to the ambient atmosphere. The bushings are located on a rotation axis 295.

FIG. 2B shows an interior side perspective view 250 of soot sensor 86 similar to the view 200 of FIG. 2A, but differs from the view 200 in that the curved surface 212 and the first surface 214 have been illustrated as transparent. In this way, the interior and the second surface 216 of soot sensor 86 are shown.

The second surface 216 comprises a second bushing 222 located directly across the first bushing 220 along the rotation axis 295. The second bushing 222 is substantially identical to the first bushing 220. As such, the second bushing 222 protrudes through the second surface 216 similar to the protrusion of the first bushing 220 of the first surface 214. A cylindrical rod 226 is rotatably coupled to the first bushing 220 and the second bushing 222 along the rotation axis 295. The rod 226 (and therefore the rotation axis 295) is located along the center of the soot sensor 86 such that all distances (e.g., radii) measured from the rod 226 to the curved surface 212 are substantially equal, in one example.

The rod 226 comprises a paddle-wheel 240 with a plurality of wheels and/or plates. In one example, there are exactly four square plates in a plus-shape configuration. However, other numbers of plates have been contemplated.

The plates may be other shapes in other examples, for example, triangular, rectangular, circular, diamond, elliptical, etc. The paddle-wheel 240 may be other suitable shapes based on different numbers of plates or different spacing between each of the plates. For example, the paddle-wheel 240 may be x-shaped, pentagonal, hexagonal, etc. The plates are fixedly coupled to the rod 226 via a combination of one or more of welds, inserts, fusions, adhesives, or other coupling elements along an edge of the plates. Other edges of the plates are in contact with one or more of the curved surface 212, first surface 214, and second surface 216.

Furthermore, paddle-wheel 240 is comprised of a metal wire-mesh such that exhaust gas may flow through the plates, in one example. The plates are coupleable to a filtering material on either one or both sides of the plates. In one example, the filtering material may be substantially identical in composition to a particulate filter in the exhaust passage 48 upstream of the secondary flow assembly 80 (e.g., PF 72 in the embodiment of FIG. 1). Specifically, the plates comprise a ceramic filtering material on an upstream surface of the plates relative to a clockwise direction (parallel to arrow 296). Thus, as exhaust gas flows into the plates, the exhaust gas may contact the filtering material prior to flowing through the wire-mesh of the plates. The exhaust gas presses against the plates where a force applied by the exhaust gas turns the plates (and the rod 226) about the rotation axis 295 in a direction similar to arrow 296. Additionally, the exhaust gas may deposit soot and/or PM on the filtering material of the plates. In some example, the plates of the paddle-wheel 240 may be comprised of the filtering material.

As shown, the plates may divide an interior of the soot sensor 86 into compartments (e.g., quadrants). The compartments are fluidly coupled to each other due to the porosity of the plates and the filtering material. As such, exhaust gas in one compartment may flow into a different compartment.

In some examples, the paddle-wheel 240 may be impervious to exhaust gas flow. In such an example, the compartments are fluidly separated from one another such that exhaust in a first compartment may not mix with exhaust in a second different compartment. As such, exhaust gas in one compartment of the compartments may be fluidly coupled to an outlet or an inlet of the soot sensor 86, while other compartments may be fluidly sealed from the outlet and inlet based on a rotational position of the paddle-wheel 240.

Thus, FIGS. 2A and 2B show a secondary flow assembly having a soot sensor with a cylindrical body and rotating plates located therein. The rotating plates are rotatably engaged with the cylindrical body such that exhaust gas rotates the plates prior to flowing out of the soot sensor. The plates are configured to have a filtering material capable of capturing soot and/or PM in the exhaust gas, where the soot may accumulate onto the filtering material. The soot captured by the soot sensor is soot that has leaked through a particulate filter upstream of the secondary flow assembly. A rotational speed of the plates may be measured by a sensor located in the soot sensor, where the rotational speed is based on at least an amount of soot deposited onto the filtering material of the plates. As such, a condition of the particulate filter upstream of the secondary flow assembly may be estimated based on the rotational speed of the plates in the soot sensor.

FIGS. 3A and 3B show example positions to which the paddle-wheel 240, of the soot sensor 86, may be adjusted along with example exhaust flows through the soot sensor 86. Thus, FIGS. 3A and 3B show relative positioning of the paddle-wheel 240 within the soot sensor 86, as the paddle-wheel 240 are adjusted to different rotational positions. FIGS. 3A and 3B show cross-sectional views of secondary flow assembly 80 and the soot sensor 86, where the cross-sectional plane is taken along line M-M' of FIG. 2. FIGS. 3A and 3B show a rotational progression of the paddle-wheel 240 as exhaust gas flows through the soot sensor 86.

The paddle-wheel 240 are rotated based on a pressure difference between an outlet 84 an inlet 82 of the soot sensor 86, where the outlet 84 is lower in pressure than the inlet 82 due to a vacuum being generated adjacent the outlet 84 as exhaust gas flows through the outlet 84. This allows exhaust gas pressing against one or more of the paddle-wheel 240 to move the paddle-wheel 240. As such, the exhaust gas may rotate the paddle-wheel 240 about the rotation axis (parallel to the rod 226, for example) in a clockwise direction (shown by arrow 296) as exhaust gas flows through the soot sensor 86. Thus, the paddle-wheel 240 may rotate mechanically without the use of electrical components.

A rotational speed of the paddle-wheel 240 may be based on at least an exhaust mass flow. As such, as exhaust mass flow increases, then a rotational speed of the paddle-wheel 240 may also increase. Conversely, if the exhaust mass flow decreases, then the rotational speed of the paddle-wheel 240 may decrease. In some examples, the exhaust mass flow may correspond to an engine load such that an estimated rotational speed may be determined for a given engine load. The rotational speed of the paddle-wheel 240 may be further based on an amount of soot accumulated onto the paddle-wheel 240, as described above. A threshold rotational speed of the paddle-wheel 240 may be based on the engine load, where the threshold rotational speed increases as engine load increases. Thus, if a rotational speed of the paddle-wheel 240 is greater than the threshold rotational speed at a given engine load, then the paddle-wheel 240 of the soot sensor 86 may be overloaded with soot (e.g., soot load is greater than a threshold soot load). This may signal a heating device (e.g., heating device 90 in the embodiment of FIG. 1) to regenerate the paddle-wheel 240. Additionally, the paddle-wheel 240 rotating at a speed greater than the threshold rotational speed may indicate an overloading of a particulate filter (e.g., particulate filter 72 in the main exhaust passage 48 shown in the embodiment of FIG. 1). A method for determining the rotational speed of the paddle-wheel 240 along with determining a status of the particulate filter in response to the rotational speed of the paddle-wheel 240 is described below in FIG. 4.

Additionally or alternatively, the paddle-wheel 240 may be at least partially actuated by a motor 280 coupled to the rod 226. The motor 280 may not be included in some embodiments of the paddle-wheel 240. The motor 280 may be electrically coupled to the soot sensor 86 for rotating the paddle-wheel 240 within the soot sensor 86. The motor 280 may be in electrical communication with a controller (e.g., controller 12 in the embodiment of FIG. 1), and may rotate the paddle-wheel 240 based on signals received from the controller. Specifically in response to increased engine load, the controller may send signals to the motor 280 to rotate the paddle-wheel 240 at an increased speed to allow exhaust gas to flow through the soot sensor 86 to limit an accumulation of exhaust backpressure in the secondary flow assembly 80. The motor 280 may be any suitable actuator such as a hydraulic, electric, pneumatic, electromechanical, or other type of actuator. The rotational speed of the paddle-wheel 240 may be adjusted by the motor 280 based on an engine operation. Specifically, the rotational speed may be adjusted based on one or more of an engine load, soot load, EGR flow rate, and other conditions. As an example, the rotational speed of the paddle-wheel 240 may increase as engine load increases, soot loading increases, and EGR flow rate decreases. Conversely, the rotational speed of the paddle-wheel 240 may decrease as engine load decreases, exhaust backpressure increases, and EGR flow rate increases. In such an example where the paddle-wheel 240 are adjusted by a motor 280, the paddle-wheel 240 may still rotate at a speed greater than the threshold rotational speed when the plates are overloaded with soot. Thus, the plates may rotate faster than a target speed set by the motor 280. Additionally or alternatively, the soot load may be estimated based on one or more of a vehicle miles driven, exhaust gas mass flow through the soot sensor 86, duration of time, emissions sensor downstream of the soot sensor 86, etc.

FIGS. 3A and 3B show cross-sectional views of the soot sensor 86 located along the secondary flow assembly 80. As such, the inlet 82 and the outlet 84 are located on opposite sides of the curved surface 212 of the soot sensor 86 with the paddle-wheel 240 located therebetween. Specifically, the inlet 82 is located on an upstream side of the curved surface 212 and the outlet 84 is located on a downstream side of the curved surface 212 with respect to a general direction of incoming exhaust flow (shown by arrow 398). The curved surface 212 comprises openings corresponding to the inlet 82 and outlet 84 to allow exhaust gas to enter and exit the soot sensor 86, respectively. The inlet 82 and the outlet 84 are aligned along a common horizontal axis above and parallel to the central axis 395 of the soot sensor 86. In some examples, the inlet 82 and outlet 84 may be misaligned (at different heights, for example) such that they are vertically (axially) unequal (according to a direction of gravity shown by arrow 299) for a vehicle with wheels on the ground, in one example.

In this way, the curved surface 212 is divided to comprise an upper arc 320 and a lower arc 322. The upper arc 320 is located above and between the openings corresponding to the inlet 82 and the outlet 84. The lower arc 322 is located below and between the openings corresponding to the inlet 82 and the outlet 84. The upper arc 320 is shorter in length than the lower arc 322 such that the lower arc 322 spans over half of a circumference of the curved surface 212. The upper arc 320 spans a remaining portion of the circumference of the curved surface 212 not comprising the openings and the lower arc 322.

As exhaust gas enters the soot sensor 86, it contacts the paddle-wheel 240 rotatably located between the upper arc 320 and the lower arc 322 of the curved surface 212 in the soot sensor 86. Specifically, the paddle-wheel 240 has four plates and/or wheels, which includes a first plate 342 having a first filtering material 343, a second plate 344 having a second filtering material 345, a third plate 346 having a third filtering material 347, and a fourth plate 348 having a fourth filtering material 349. Each filtering material of the filtering materials is physically coupled to an upstream face of one plate of the paddle-wheel 240. In the example of FIG. 3A, the first filtering material 343 faces the inlet 82 (e.g., a direction of incoming exhaust flow) as exhaust gas (shown by arrow 330) enters the soot sensor 86. Thus, as exhaust gas flows into the soot sensor 86, the exhaust gas may contact the filtering material before contacting the wire mesh of the plates of the paddle-wheel 240. In one example, exhaust gas entering the soot sensor 86 flows into a compartment (e.g., quadrant) and rotates the plates before flowing out the soot sensor 86 and into the outlet 84. In embodiments where the paddle-wheel 240 are impervious to exhaust gas flow, exhaust gas is held in a single quadrant and does not flow to adjacent quadrants. Furthermore, the exhaust gas rotates its respective quadrant until the quadrant aligns with the outlet 84 such that exhaust gas may exit the soot sensor 86.

Each of the paddle-wheel 240 is separated by an angle $\theta_2$. In one example, the angle $\theta_2$ is exactly 90° such that adjacent plates are perpendicular to each other (e.g., first plate 342 and second plate 344) and plates opposite one another are parallel (e.g., second plate 344 and fourth 348). In some examples, the angle $\theta_2$ may be greater than 90° (if there are less than four plates, for example, $\theta_2$ may be 120° if there are three plates) or the angle $\theta_2$ may be less than 90° (if there are more than four plates, for example, $\theta_2$ may be 72° if there are five plates). Angle $\theta_1$ is an angle measured from the rod 226 to the edges of the upper arc 320 corresponds to an arc length of the upper arc 320. In one example, the angle $\theta_1$ is greater than the angle $\theta_2$. Thus, if the angle $\theta_2$ is increased, then the angle $\theta_1$ may be correspondingly increased. In this way, the angle $\theta_1$ is greater than a greatest angle measured between adjacent plates of the paddle-wheel 240. As such, one or more of the first 342, second 344, third 346, and fourth 348 plates may be engaged with the upper arc 320 at any position of the paddle-wheel 240. In one example, at least one of the paddle-wheel 240 is engaged with the upper arc 320 in any rotational position of the paddle-wheel 240. Additionally, during some positions of the rotation of the paddle-wheel 240, two plates of the paddle-wheel 240 may be engaged with the upper arc 320 at the same time. In this way, exhaust gas flows through at least one plate of the paddle-wheel, along with a corresponding filtering material of the plate, before flowing out of the soot sensor 86.

Thus, the soot sensor 86 is configured to receive exhaust gas and allow the exhaust gas to rotate paddle-wheel 240 before flowing through the outlet 84 and back into a primary exhaust passage (e.g., exhaust passage 48 of FIG. 1).

FIGS. 3A and 3B will now be described individually. FIGS. 3A and 3B show a rotation of the paddle-wheel 240 as a sample exhaust flow flows through the soot sensor 86.

Turning now to FIG. 3A, it shows a first embodiment 300 of the secondary flow assembly 80 configured to include the soot sensor 86 with the paddle-wheel 240 in a first rotational position where the second 344 and fourth 348 plates are parallel to a central axis 395. Thus, the first 342 and third 346 plates are perpendicular to the central axis 395. The first plate 342 is engaged with the upper arc 320 and the second 344, third 346, and fourth 348 plates are engaged with the lower arc 322. Exhaust gas flows into the soot sensor 86 from the inlet 82 (shown by arrow 330), where the exhaust gas enters a first quadrant 352 between the first plate 342 and the fourth plate 348. Exhaust gas in the first quadrant 352 may flow to the other quadrants including a second quadrant 354 between the first plate 342 and the second plate 344, a third quadrant 356 between the second plate 344 and the third plate 346, and a fourth quadrant 358 between the third plate 346 and the fourth plate 348. In the rotational position shown, the first quadrant 352 is directly fluidly coupled to the inlet 82 and the second quadrant 354 is directly fluidly coupled with the outlet 84. In one example, exhaust gas may flow through the paddle-wheel 240 and out the soot sensor 86 independent of a rotational position of the paddle-wheel 240 (shown by arrow 333). Exhaust gas may flow through at least the first plate 342 before flowing out the soot sensor 86 and into the outlet 84. Furthermore, exhaust gas may flow through at least the first 352 and second 354 quadrants before exiting the soot sensor 86.

As shown, a portion of the exhaust flow entering the first quadrant 352 presses against the first plate 342 and/or first filtering material 343 (as shown by arrows 332, for example). Exhaust gas contacting the first filtering material 343 may deposit some soot onto the first filtering material 343. A remaining portion of exhaust gas flows through the first plate 342 and first filtering material 343 and into the outlet 84. Additionally or alternatively, exhaust gas from the first quadrant 352 may flow into any of the other quadrants of the soot sensor 86 before entering the outlet 84. As exhaust gas exits the soot sensor 86, a pressure near the outlet 84 decreases which may further enable exhaust gas to spin the paddle-wheel 240.

Alternatively, if the paddle-wheel 240 are impervious to exhaust gas flow, only exhaust gas in the second quadrant 354 may flow into the outlet 84 when the paddle-wheel 240 are in the first rotational position in the example shown. Thus, exhaust gas in the first quadrant 352 may not flow into the outlet 84 or into other quadrants. Exhaust gas in a quadrant may flow through the outlet 84 when its quadrant is fluidly coupled to the outlet 84.

Turning now to FIG. 3B, it shows a second embodiment 325 of the soot sensor 86 with the paddle-wheel 240 in a second rotational position. It will be appreciated that a plurality of rotational positions may occur between the first rotational position in the first embodiment 300 of FIG. 3A and the second rotational position. Thus, the rotational positions described in the present disclosure are example rotational positions. In the second rotational position, all of the paddle-wheel 240 are oblique to the central axis 395 (by an angle of 45°, for example). As such, the first 342 and fourth 348 plates are engaged with the upper arc 320 and the second 344 and third 346 plates are engaged with the lower arc 322. Thus, exhaust gas flow entering the soot sensor 86 (shown by arrow 360) flows through at least the fourth plate 348, the fourth filtering material 349, the first filtering material 343, and the first plate 342 before flowing into the outlet 82. Exhaust gas entering the soot sensor 86 (shown by arrow 360) presses against the fourth plate 348 and the first plate 342 (shown by arrows 362). Exhaust gas pressing against or passing through the fourth plate 348 may deposit soot onto the fourth filtering material 349. The exhaust gas may further deposit soot onto the first filtering material 343 once it reaches the first plate 342 after passing through the fourth plate 348 and fourth filtering material 349. As shown, exhaust flow 362 may assist exhaust flow 332 in pressing against the first plate 342 and rotating the paddle-wheel 240. As the paddle-wheel 240 gathers additional soot, the plates may rotate faster than a paddle-wheel in a less loaded condition.

FIG. 4 shows a system 400 comprising the secondary flow assembly 80 and exhaust passage 48. Thus, components previously introduced are numbered similarly in subsequent figures and may not be reintroduced. In this embodiment, the secondary flow assembly 80 includes an example rotatable paddle-wheel 240 configured with paddles having a substrate configured to capture soot located thereon, as described above.

The exhaust passage 48 is located within a cylindrical exhaust pipe 402 for conducting gas (e.g., exhaust gas) from an engine (e.g., engine 10 of FIG. 1) to an ambient atmosphere through a tailpipe parallel to a direction of arrow 398. As such, the exhaust pipe 402 is configured to prevent the exhaust gas from flowing to the ambient atmosphere until the exhaust gas reaches the tailpipe. The exhaust pipe 402 comprises two openings corresponding to the inlet 82 and the outlet 84 of the secondary flow assembly 80. As shown, the inlet 82 and the outlet 84 protrude through an entire thickness of the exhaust pipe 402 and into the exhaust passage 48. Specifically, the inlet 82 protrudes into the exhaust passage 48 beyond a central axis 495 of the exhaust passage 48 distal to the exhaust pipe 402. Conversely, the outlet 84 protrudes into the exhaust passage 48 vertically higher than the central axis 495 proximal to the exhaust pipe 402 for a vehicle with its wheels on flat, level ground. Both the inlet 82 and the outlet 84 perpendicularly intersect the exhaust pipe 402. Thus, vertical axes of the inlet 82 and the outlet 84 are perpendicular to the central axis 495. In this way, exhaust gas being diverted to the secondary flow assembly 80 via the inlet 82 flows perpendicularly to the arrow 398. Furthermore, exhaust gas flowing back to the exhaust passage 48 from the secondary flow assembly 80 via the outlet 84 also flows perpendicularly to the arrow 398.

Arrows in the exhaust passage 48, inlet 82, and outlet 84 depict a direction of exhaust gas flow. The inlet 82 is configured to receive a portion of incoming exhaust flow (indicated by arrows 430) via a plurality of perforations 410 located on an upstream face of the inlet 82 facing incoming exhaust flow. The perforations 410 may be substantially equal in size. Additionally or alternatively, the perforations 410 may be equally spaced apart from one another. A portion of the incoming exhaust flow may enter the inlet 82 via the perforations 410, as shown by arrows 432, while a remaining portion of the incoming exhaust flow flows passed the inlet 82, as shown by arrows 434. In one example, a mass of the portion of exhaust gas entering the inlet 82 is less than a mass of the portion of exhaust gas flowing passed the inlet 82 (arrows 434). Thus, a majority of exhaust gas in the exhaust passage 48 flows around and does not enter the inlet 82, in one example.

The inlet 82 is further configured to substantially prevent larger particulates and water droplets (shown by circles 436) from entering the soot sensor 86. Larger particulates and water droplets may impinge onto surfaces of the soot sensor 86 and decrease a fidelity of results provided by the soot sensor 86. In one example, larger particulates may impinge onto a downstream surface of the inlet 82 due to the greater momentum of larger particulates compared to smaller particulates. Additionally, water vapor in the exhaust gas entering the inlet 82 may condense onto portions of the inlet 82 outside of the exhaust passage 48. This may be due to a temperature difference between the portion of the inlet 82 away from the exhaust passage 48 and the portion of the inlet 82 in the exhaust passage 48. Specifically, the portion of the inlet 82 outside of the exhaust passage 48 may be a lower temperature than a dew point temperature of water vapor. As such, the water vapor may crash out of the exhaust gas in the inlet 82 and flow down the inlet 82 toward a drain hole 412. Thus, water condensate (e.g., droplets) may flow out of the inlet 82 in a direction opposite exhaust gas flow in the inlet 82 (e.g., down as opposed to up, respectively). Furthermore, the water condensate may sweep the larger particulates that have impinged onto surfaces inside the inlet 82 out the drain hole 412. In this way, larger particulates and water droplets are substantially prevented from reaching the soot sensor 86.

Exhaust gas in the inlet 82 flows through a vertical portion 450 of the inlet 82 before flowing through a bend 452, where the exhaust gas is turned in a direction angled to exhaust flow in the vertical portion 450. Exhaust gas flows through a horizontal portion 454 after the bend 452, where exhaust gas in the horizontal portion 454 flows to the soot sensor 86. The horizontal portion 454 is parallel to the x-axis and the vertical portion 450 is parallel to the y-axis such that the portions are perpendicular to one another.

In some examples, the vertical portion 450 may be hotter than the bend 452 and the horizontal portion 454. This may be due to the vertical portion 450 being more proximal to the exhaust passage 48. Thus, water droplets may condense in or near the bend 452. As shown, the horizontal portion 454 is spaced away from the exhaust pipe 402.

Exhaust gas enters the soot sensor 86 via the horizontal portion 454, where the exhaust gas contacts one or more of a first plate 342, a second plate 344, a third plate 346, and a fourth plate 348. The paddle-wheel 240 rotates as it captures soot from the exhaust gas.

A rotational speed of the paddle-wheel 240 may be determined by a speed sensor, in one example. Other devices and/or methods used to determine rotational speeds may also be used. As an example, the rotational speed of the paddle-wheel 240 may be inferred based on an exhaust flow rate in the outlet 84. The rotational speed may vary based on a combination of one or more of engine load, EGR flow rate, paddle-wheel soot load, in-cylinder pressure, and other conditions. In one example, the rotational speed may increase as the engine load increases, the EGR flow rate decreases, paddle-wheel soot load increases, and in-cylinder pressure increases. Thus, the plates of the paddle-wheel 240 may be fully loaded with soot when a rotational speed of the paddle-wheel 240 exceeds a threshold rotational speed. The threshold rotational speed may be based on a combination of one or more conditions altering rotational speed (e.g., engine load, EGR flow rate, in-cylinder pressure, etc.). As an example, the threshold rotational speed is higher at high engine loads compared to low engine loads.

When the rotational speed of the paddle-wheel exceeds the threshold rotational speed, a heating element 90 may be used to regenerate the paddle-wheel 240. The heating element 90 may be integrated into a substrate (filtering material) of the plates of the paddle-wheel 240, where the heating element 90 filtering materials of the paddle-wheel 240. By doing this, at least some of the stored soot on the filtering materials may be burned off and swept out of the soot sensor 86 via incoming exhaust flow. The heating element 90 may comprise, but is not limited to, a temperature sensor and a heater. Possible materials for the heater and the temperature sensor forming the heating element 90 may include platinum, gold, palladium, and the like; and alloys, oxides, and combinations comprising at least one of the foregoing materials, with platinum/alumina, platinum/palladium, platinum, and palladium. Specifically, during conditions when the particulate matter load or soot load of the plates is higher than a threshold load (e.g., or the rotational speed of the paddle-wheel 240 is greater than the threshold rotational speed), heating element 90 may be operated to burn accumulated soot particles from the filtering materials of plates. During PM sensor regeneration, the controller 12 may provide a voltage to a voltage source 470, which is needed for operating the heating element 90. In addition, the controller 12 may close the switch 472 for a threshold time to apply the voltage via the voltage source 470 to the heating element 90 to raise the temperature of the paddle-wheel 240. Subsequently, when the plates are sufficiently clean (e.g., in response to the rotational speed being less than or equal to a threshold regeneration rotational speed), the controller 12 may open the switch 472 to stop heating the heating element 90. By intermittently regenerating the soot sensor 86, it may be returned to a condition (e.g., unloaded or only partially loaded condition) more suitable for collecting exhaust soot. In addition, accurate information pertaining to the exhaust soot level may be inferred from the sensor regeneration and this information may be used by the controller 12 for diagnosing leaks in the particulate filter, as described below.

Exhaust gas exits the soot sensor 86 via horizontal tube 464 of outlet 84. Exhaust gas in the horizontal tube 464 enters a curve 462 when the exhaust gas flows in a direction angled to a direction of exhaust flow in the horizontal tube 464. Exhaust gas then enters a vertical tube 460 of the outlet 84, where the exhaust gas flows in a direction perpendicular to the direction of exhaust flow in the horizontal tube 464. Exhaust gas in the vertical tube 460 flows into the exhaust passage in a direction perpendicular to the direction of exhaust flow in the exhaust passage (arrow 398) before turning and flowing substantially parallel to arrow 398. As shown, exhaust gas in the vertical tube 460 flows in a direction opposite to a direction of exhaust flow in the vertical portion 450 of the inlet 82.

In this way, exhaust gas may be diverted away from a main exhaust passage to a secondary exhaust flow assembly, where the exhaust gas is directed to a soot sensor. A rotatable paddle-wheel comprising particulate filtering materials is configured to capture soot in the exhaust flow in the secondary flow assembly while simultaneously rotating. A rotational speed of the paddle-wheel increases as the soot load on the paddle-wheel increases. The rotational speed may be compared to a threshold rotational speed based on a current engine load along with other current engine conditions (e.g., EGR flow, air/fuel ratio, etc.). If the rotational speed of the paddle-wheel at the given engine load exceeds the threshold rotational speed, then the paddle-wheel is overloaded with soot. The heating element is activated to heat the paddle-wheel and burn off some of the stored soot. In one example, an overloading of the paddle-wheel may also indicate an overloading of a particulate filter upstream of the secondary flow assembly in the main exhaust passage (e.g., PF 72 in the exhaust passage 48). Additionally or alternatively, a time interval between subsequent regenerations of the paddle-wheel and/or particulate filter may be measured and compared to a threshold time interval to determine a degradation of the particulate filter, as described below.

Turning now to FIG. 5, a method 500 is shown for determining if a particulate filter in a main engine exhaust passage is degraded (e.g., leaking and/or burned up) via comparing a regeneration time interval of a paddle-wheel of a secondary flow assembly to a threshold time interval. Instructions for carrying out method 500 may be executed by a controller (e.g., controller 12 shown in FIG. 1) based on instructions stored on a memory of the controller and in conjunction with signals received from various sensors of the engine system, such as the sensors described above with reference to FIGS. 1, 2A, 2B, and 3. The controller may employ engine actuators of the engine system to adjust engine operation, according to the methods described below.

Method 500 may be described with reference to components described above, more specifically, with reference to engine 10, controller 12, particulate filter 72, secondary flow assembly 80, exhaust passage 48, and paddle-wheel 240 with respect to FIGS. 1, 2A, and 2B.

Method 500 begins at 502 to determine, estimate, and/or measure current engine operating parameters. Current engine operating parameters may include an engine load, engine speed, EGR flow rate, vehicle speed, manifold vacuum, throttle position, exhaust pressure, and an air/fuel ratio.

At 504, the method 500 includes estimating a rotational speed of the paddle-wheel in the soot sensor of the secondary flow assembly. A speed sensor in the soot sensor may be used to estimate the rotational speed. Alternatively or additionally, an exhaust pressure sensor in an outlet of the secondary flow assembly may be used, where the rotational speed of the paddle-wheel may be calculated based on a measured exhaust pressure. Alternatively or additionally, the exhaust pressure sensor may be located in an inlet of the secondary flow assembly. Other systems and method may be used to estimate the rotational speed of the paddle-wheel. As mentioned above, the rotational speed of the paddle-wheel may be based on a combination of one or more of the engine load and a soot load of the paddle-wheel.

At 506, the method 500 includes determining if the rotational speed of the paddle-wheel is greater than the threshold rotational speed. The threshold rotational speed may be based on a rotational speed of the paddle-wheel at a given engine load where a soot loading of the paddle-wheel is less than a threshold soot load. As an example, the threshold rotational speed is higher at a high engine load compared to a low engine load. As such, a paddle-wheel spins faster at the high engine load compared to the low engine load. The paddle-wheel may be in a condition suitable for capturing soot when a soot load of the paddle-wheel is less than the threshold soot load (e.g., partially loaded or not loaded). As such, the threshold soot load may be based on a soot load of the paddle-wheel where the paddle-wheel is unable to sufficiently capture soot. If the soot load exceeds the threshold soot load, then a rotational speed of the paddle-wheel exceeds the threshold speed due to an increased mass of the paddle-wheel (e.g., due to the accumulated soot) increasing the rotational speed of the paddle-wheel at a given engine load.

If the rotational speed is less than the threshold rotational speed, then the method 500 proceeds to 508 to maintain current engine operations and continue monitoring the rotational speed of the paddle-wheel. The method 500 also maintains a circuit electrically coupled to the paddle-wheel to remain open. For example, a controller 12 signals to maintain switch 472 of voltage source 470, as shown in FIG. 4, open such that a regeneration of the paddle-wheel 240 does not occur.

If the rotational speed is greater than the threshold rotational speed, then the method 500 proceeds to 510 to activate the heating element by closing the voltage source in order to regenerate the paddle-wheel. For example, controller 12 signals to actuate switch 472 of circuit voltage source 470 to a closed position to allow heating element 90 to heat filtering materials and/or plates of the paddle-wheel. As described above, by heating the paddle-wheel, a temperature of the paddle-wheel may be high enough to burn off some or all of the soot accumulated onto filtering materials of the paddle-wheel.

The switch remains in the closed position until the regeneration is complete, in one example. A complete regeneration may include burning off substantially all of the soot stored on the filtering materials of the paddle-wheel. A partial regeneration may include burning off some of the soot stored on the filtering materials of the paddle-wheel. The complete regeneration may be longer than the partial regeneration. At 512, the method 500 includes terminating the regeneration. The regeneration may be terminated in response to the rotational speed of the paddle-wheel being equal to or less than the threshold rotational speed, which may correspond to a partial regeneration. Alternatively, the regeneration may be complete once the rotational speed reaches a threshold regeneration rotational speed. The threshold regeneration rotational speed is based on a rotational speed of a fully unloaded (e.g., no soot) paddle-wheel at a given engine load. The threshold regeneration rotation speed may correspond to a complete regeneration of the paddle-wheel. In some examples, the threshold regeneration rotational speed is less than the threshold rotational speed. In some embodiments, additionally or alternatively, the regeneration may be terminated after a set duration of time (e.g., 20 seconds). The duration of time may be based on an average amount of regeneration time used to decrease the rotational speed to below the threshold rotational speed.

Additionally or alternatively, the method 500 may further initiate a regeneration of a particulate filter in the main exhaust passage (e.g., particulate filter 72 in exhaust passage 48) when the rotational speed of the paddle-wheel exceeds the threshold rotational speed. In this way, the particulate filter and the paddle-wheel may be simultaneously regenerated. Regenerating the particulate filter may include adjusting a combination of one or more engine conditions including delaying a fuel injection, increasing a fuel injection pressure, retarding spark, increasing an air/fuel ratio, etc. In some examples, by adjusting the engine operation in this way, the paddle-wheel may also be regenerated without activating the heating element. Engine operation may return to a nominal engine operation (e.g., stoichiometric air/fuel ratio, desired fuel injection timing, desired fuel injection pressure, optimal spark timing, etc.) in response to a tip-in. Therefore, the regenerations of the particulate filter and the paddle-wheel may be initiated and terminated at the same time. In other examples, the regeneration of the particulate filter may be carried out by a heating element coupled to the particulate filter. In one example, the regeneration of the particulate filter may be terminated in response to the regeneration of the paddle-wheel being terminated. In another example, the regeneration of the particulate filter may be terminated in response to a pressure difference between directly upstream of the particulate filter and directly downstream of the particulate filter being less than a threshold difference. In this way, a backpressure upstream of the particulate filter is sufficiently reduced such that exhaust gas may flow through the filter at a desired flow rate. The regeneration of the paddle-wheel may also be terminated in response to the pressure difference upstream and downstream of the PF being less than the threshold difference. In some examples, the paddle-wheel and the particulate filter may be regenerated independent of each other.

At 514, the method 500 includes determining a time interval between a last regeneration and a current regeneration of the paddle-wheel. The last regeneration is defined as a regeneration event that occurred directly before the current regeneration event. The time interval may be calculated based on a duration of time between initiation of the last regeneration and initiation of the current regeneration (e.g., 120 minutes). A time interval may be less than a previous time interval as the particulate filter in the main exhaust passage becomes degraded and captures less soot. For example, the particulate filter develops leaks due to high regeneration temperatures, road conditions, etc., which may allow a greater amount of soot to flow to the paddle-wheel, resulting in more frequent regenerations of the paddle-wheel.

At 516, the method 500 determines if the measured time interval is less than a threshold time interval. The threshold time interval may be based on a set threshold (e.g., 200 minutes), a last time interval measured, or a percentage of the last time interval measured (e.g., 50% of the last time interval). Further, the threshold time interval may be based on a threshold that indicates that the time interval is decreasing and the paddle-wheel is being regenerated at an increasing rate. Additionally or alternatively, the threshold time interval may be adjusted based on engine operating parameters. For example, the threshold time interval may decrease as an engine load increases.

If the time interval is not less than the threshold time interval, then the method 500 proceeds to 508 to maintain current engine operation and continue monitoring the rotational speed of the paddle-wheel.

If the time interval is less than the threshold time interval, then the method 500 proceeds to 518 to indicate (e.g., flag) the particulate filter of the main exhaust passage, upstream of the paddle-wheel in the secondary flow assembly, is degraded. Indication of the particulate filter being degraded may include adjusting an engine operation and activating an indicator lamp 520 (e.g., in order to indicate to a vehicle operator that the particulate filter is degraded and needs to be replaced).

As an example, a controller (e.g., controller 12) may signal various actuators of an engine (e.g., throttle 62 of engine 10) to limit a torque output of the engine to reduce exhaust produced to meet emissions standards. As another example, additionally or alternatively, the method 500 may advance one or more of a spark timing and fuel injection, increase air/fuel ratio, and/or increase EGR. By increasing EGR flow to one or more cylinders of the engine, a combustion mixture temperature(s) is decreased and a volume of fuel injection may be decreased. By doing this, an amount of soot being exhausted from one or more cylinders of the engine may be decreased.

Thus, the method of FIG. 5 provides for a method comprising diverting exhaust gas from a primary exhaust passage to a secondary flow assembly, where the secondary flow assembly is configured to have a soot sensor comprising a rotatable paddle-wheel. The paddle-wheel includes at least one filtering material coupled to each of its plates and/or wheels. The method includes adjusting engine operation based on an estimated rotational speed of the paddle-wheel when the rotational speed exceeds a threshold rotational speed. The rotational speed is based on a soot load of the paddle-wheel, where soot captured by the paddle-wheel has flowed passed the particulate filter in the main exhaust passage.

The method further comprises during a first condition when particulate filter regeneration conditions are met and in response to the time interval being greater than a threshold time interval, regenerating the particulate filter in the engine exhaust pipe via a combination of one or more of retarding spark and decreasing an air/fuel ratio and during a second condition and in response to the time interval being less than the threshold time interval, indicating to an operator degradation of the particulate filter and adjusting an engine actuator to reduce torque output.

FIG. 6 depicts an operating sequence 600 illustrating example results for an engine operating with a secondary flow assembly (e.g., such as the secondary flow assembly 80 shown in FIG. 1). Line 602 represents if a paddle wheel of the secondary flow assembly is regenerating, line 604 represents a rotational speed of the paddle-wheel, dotted line 605 represents the threshold regeneration rotational speed, and dotted line 606 represents the threshold rotational speed, line 608 represents if a particulate filter in a main exhaust passage is degraded, line 610 represents a paddle-wheel soot load, and line 612 represents a threshold soot load of the paddle-wheel. Double headed arrows I1, I2, and I3 represent measured time intervals between a last regeneration and a current regeneration of the paddle-wheel. The horizontal axes of each plot represent time and time increases from the left side of the figure to the right side of the figure.

FIG. 6 is illustrative by nature and time intervals between regenerations of the paddle-wheel may be greater than or less than the time intervals depicted. Additionally or alternatively, degradation of the particulate filter in the main exhaust passage may occur over a threshold mileage (e.g., 25,000 miles).

Prior to t1, the paddle-wheel is not being regenerated, as indicated by line 602. As such, a heating element of the paddle-wheel is not active. The rotational speed of the paddle-wheel is less than the threshold rotational speed, as shown by lines 604 and 606 respectively. The particulate filter located in the exhaust pipe is not degraded, as shown by line 608. The paddle-wheel soot load is relatively low and below the threshold soot load, as indicated by lines 610 and 612, respectively. As depicted, the rotational speed and the paddle-wheel soot load are substantially identical due to the rotational speed being at least partially dependent on the paddle-wheel soot load. For a constant engine load, a paddle-wheel soot increasing may result in a similar rotational speed increasing. Thus, the rotational speed can be used as an indicator of soot loading of the paddle-wheel.

At t1, the paddle-wheel soot load exceeds the threshold soot load and the rotational speed exceeds the threshold rotational speed. In response, a switch of a voltage source of the heating element electrically coupled to the paddle-wheel closes to initiate regeneration of the paddle-wheel. The particulate filter in the exhaust pipe is not degraded due to a subsequent regeneration having not yet occurred.

After t1 and prior to t2, the regeneration of the paddle-wheel continues. As the paddle-wheel regenerates, soot is burned off the filtering materials of the paddle-wheel and consequently the rotational speed and soot load decrease. As described above, the regeneration may terminate after a predetermined amount of time or it may terminate based on the rotational speed decreasing below the threshold regeneration rotational speed, as shown at 605, which is lower than the threshold rotational speed shown at 606. In other examples, the regeneration of the paddle-wheel may occur for a predetermined amount of time (e.g., 20 seconds). As the regeneration takes place, the rotational speed and the paddle-wheel soot load decrease to a relatively low rotational speed and soot load. In one example, terminating a regeneration following the rotational speed decreasing below the threshold regeneration rotational speed may correspond to a complete regeneration. Furthermore, terminating a regeneration when the rotational speed is between the threshold rotational speed and the threshold regeneration rotational speed may correspond to a partial regeneration. The particulate filter in the exhaust pipe is not degraded.

At t2, the regeneration of the paddle-wheel is terminated via actuating the switch of the voltage source of the heating element to an open position in response to the rotational speed decreasing below the threshold regeneration rotational speed, as described above. The particulate load on the paddle-wheel begins to increase (e.g., soot is captured onto the paddle-wheel without being burned). The particulate filter in the exhaust pipe is not degraded.

After t2 and prior to t3, the rotational speed and the paddle-wheel soot load increase toward the threshold rotational speed and threshold soot load respectively. The regeneration remains deactivated. The particulate filter in the exhaust pipe is not degraded.

At t3, the paddle-wheel soot load exceeds the threshold soot load. As such, the rotational speed exceeds the threshold rotational speed. In response, regeneration of the paddle-wheel is initiated. During the course of the paddle-wheel regeneration, the time interval between the start of the current paddle-wheel regeneration and the start of the last paddle-wheel regeneration is measured, as shown by I1. Thus, I1 measures a time interval between t1 and t3. If the time interval is less than a threshold time interval then the particulate filter of the exhaust pipe may be degraded, as described above. In this example, I1 is greater than the threshold time interval and the particulate filter in the exhaust pipe is not degraded. The time interval in the example of the figure is depicted as a threshold amount of time. As described above, the threshold time interval may vary based on engine conditions or may be based on previous time intervals between subsequent regenerations. For example, the threshold time interval may be substantially equal to two-thirds of a previous time interval.

As an example, if a previous time interval is equal to 60 minutes, then the threshold time interval for the next measured time interval may be equal to 40 minutes. If the next time interval is less than 40 minutes, then the particulate filter may be degraded.

After t3 and prior to t4, the regeneration of the paddle-wheel continues due to the rotational speed being greater than the threshold regeneration rotational speed. As the regeneration takes place, the rotational speed and the paddle-wheel soot load decrease to a relatively low rotational speed and relatively low load, respectively.

At t4, the regeneration of the paddle-wheel is terminated, due to the rotational speed decreasing to a rotational speed less than the threshold regeneration rotational speed, via actuating the switch of the heating element to an open position, as described above. The particulate load on the paddle-wheel is relatively low (e.g., substantially equal to zero). Additionally, the rotational speed begins to increase.

After t4 and prior to t5, the rotational speed and the paddle-wheel soot load continue to increase to a relatively high rotational speed and high load respectively. The regeneration remains deactivated due to the rotational speed being less than the threshold rotational speed.

At t5, the paddle-wheel soot load exceeds the threshold soot load. Thus, the rotational speed exceeds the threshold rotational speed. In response, regeneration of the paddle-wheel is initiated. I2 is measured similar to the measurement of I1, except it measures a time interval between t5 and t3. I2 is greater than the threshold time interval and the particulate filter in the exhaust pipe is not degraded.

After t5 and prior to t6, the regeneration of the paddle-wheel continues due to the rotational speed being greater than the threshold regeneration rotational speed. As the regeneration takes place, the rotational speed and the paddle-wheel soot load decrease to a relatively low rotational speed and relatively low load, respectively.

At t6, the regeneration of the paddle-wheel is terminated via actuating the switch of the electric circuit to an open position in response to the rotational speed decreases below the threshold regeneration rotational speed, as described above. The particulate load on the paddle-wheel is relatively low.

After t6 and prior to t7, the rotational speed and the paddle-wheel soot load continue to increase to a relatively high rotational speed and high load respectively. The regeneration is inactive.

At t7, the paddle-wheel soot load exceeds the threshold soot load and the rotational speed exceeds the threshold rotational speed. In response, regeneration of the paddle-wheel is initiated. I3 measures a time interval between t7 and t5. I3 is less than the threshold time interval and thus, the particulate filter in the exhaust pipe is determined to be degraded, as depicted by line 608. A controller may indicate degradation of the particulate filter in the main exhaust passage in response to the time interval decreasing below the threshold time interval. Furthermore, the controller (e.g., controller 12) may adjust engine operation in response to the degraded particulate filter. The adjustments may include one or more of turning on an indicator lamp and limiting a vehicle torque output, as described above with respect to FIG. 5.

After t7, and prior to t8, the regeneration of the paddle-wheel continues due to the rotational speed being greater than the threshold regeneration rotational speed. As the regeneration takes place, the rotational speed and the paddle-wheel soot load decrease to a relatively low speed and relatively low load, respectively. The particulate filter in the exhaust pipe remains degraded.

At t8, the regeneration of the paddle-wheel is terminated via actuating the switch of the heating element to an open position in response to the rotational speed decreasing below the threshold regeneration rotational speed, as described above. The particulate load on the paddle-wheel stays low due to the adjustments made by the controller to decrease soot output. Therefore, the rotational speed remains low.

After t8, the adjustments are maintained and the paddle-wheel soot load and the rotational speed remain at relatively low values. The particulate filter in the exhaust conduit remains degraded.

In this way, by diverting a portion of exhaust gas from a main exhaust passage to a secondary flow assembly, a soot sensor comprising a paddle-wheel in the secondary flow assembly may be used to determine degradation of a particulate filter in the main exhaust passage upstream of the secondary flow assembly. Additionally, by rotating the paddle-wheel and placing it in the secondary flow assembly, soot deposition uniformity on the paddle-wheel is increased compared to placing the soot sensor in the main exhaust passage. Thus, sensitivity and/or reliability of the paddle-wheel is increased and the particulate filter in the exhaust conduit may be more accurately determined as degraded or not degraded. The technical effect of flowing exhaust to the secondary flow assembly toward the soot sensor is to determine a condition of a particulate filter (e.g., degraded or not degraded) in the main exhaust passage to meet an emissions standard. A rotational speed of the paddle-wheel may be compared to a threshold rotational speed, where if the rotational speed of the paddle-wheel exceeds the threshold rotational speed, then the paddle-wheel is fully loaded with soot. The paddle-wheel may be regenerated in response to the rotational speed increased beyond the threshold rotational speed. As a time interval between initiations of subsequent regenerations decreases, the particulate filter in the main exhaust passage may be indicated as being degraded.

A method comprising diverting exhaust gas from an exhaust pipe to a parallel exhaust pathway outside the exhaust pipe, where the exhaust pathway includes rotatable plates coupled to a filtering material in a fixed housing and adjusting engine operation based on a rotational speed of the plates. A first example of the method further includes where the rotational speed is correlated to a soot load of the plates, and where the plates are regenerated in response to the rotational speed being greater than a threshold rotational speed. A second example of the method optionally including the first example further includes where adjusting engine operation is further based on a time interval between subsequent last and current regeneration events of the plates being less than a threshold time interval. A third example of the method optionally including the first and/or second examples further includes where the time interval is measured from an initiation of the last regeneration event to an initiation of the current regeneration event. A fourth example of the method optionally including one or more of the first through third examples further includes where the exhaust pipe is fluidly coupled to the exhaust pathway via an inlet pipe and an outlet pipe of the exhaust pathway, and where the inlet pipe comprises one or more perforations on a portion of the inlet pipe disposed inside an interior of the exhaust pipe. A fifth example of the method optionally including one or more of the first through fourth examples further includes where flowing exhaust gas through the fixed housing of the plates, an inlet of the housing being located directly across an outlet of the fixed housing with the plates located therebetween. A sixth example of the method optionally including one or more of the first through fifth examples further includes where diverting exhaust gas from the exhaust pipe to the exhaust pathway further includes flowing the exhaust gas through at least one plate of the plates in the fixed housing before returning the exhaust gas to an exhaust passage in the exhaust pipe. A seventh example of the method optionally including one or more of the first through sixth examples further includes where the plates are square and the filtering material is comprised of a particulate filter substrate configured to capture soot in an exhaust gas flow. An eighth example of the method optionally including one or more of the first through seventh examples further includes where the plates are porous.

A second example method, comprising adjusting engine operation based on degradation of a particulate filter in an engine exhaust pipe, the degradation determined based on a time interval between a first regeneration and a second regeneration of rotating filters in a cylindrical housing located along a secondary passage positioned outside of the engine exhaust pipe. A first example of the second example method further includes where an inlet and an outlet of the auxiliary passage are coupled to the engine exhaust pipe downstream of the particulate filter, and where the inlet and the outlet are physically coupled to the cylindrical housing at equal axial heights. A second example of the second example method optionally including the first example further includes where the rotating filters are a plus-shape, and where sides of the rotating filters are engaged with interior surfaces of the cylindrical housing. A third example of the second example method optionally including the first and/or second examples further includes where regenerating the rotating filters is in response to a rotational speed of the rotating filters being greater than a threshold rotational speed, and where the threshold rotational speed is based on a combination of one or more of an engine load, EGR flow rate, and air/fuel ratio. A fourth example of the second example method optionally including one or more of the first through third examples further includes where during a first condition when particulate filter regeneration conditions are met and in response to the time interval being greater than a threshold time interval, regenerating the particulate filter in the engine exhaust pipe via a combination of one or more of retarding spark and decreasing an air/fuel ratio and during a second condition and in response to the time interval being less than the threshold time interval, indicating to an operator degradation of the particulate filter and adjusting an engine actuator to reduce torque output.

An engine exhaust system comprising an exhaust passage comprising a hollow cylindrical housing with a plurality of plates configured to rotate as exhaust flows through the cylindrical housing, the plates having a soot trapping material coupled thereto. A first example of the system further includes where exhaust gas flows through at least one plate of the plates before flowing out of the cylindrical housing. A second example of the system optionally including the first example further includes where the cylindrical housing comprises an upper arc and a lower arc, and where at least one plate of the plates is engaged with the upper arc independent of a rotational position of the plates and at least a second different plate of the plates is engaged with the lower arc independent of the rotational position of the plates. A third example of the system optionally including the first and/or second example further includes where an angle between each plate of the plurality of plates is less than an angle corresponding to an arc length of the upper arc. A fourth example of the system optionally including one or more of the first through third examples further includes where the cylindrical housing has no additional inlets or different outlets than an inlet and an outlet to the passage. A fifth example of the system optionally including one or more of the first through fourth examples further includes where an electronic controller with instructions to adjust engine operating parameters responsive to a rotational speed of the plates during engine operation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
 diverting exhaust gas from an exhaust pipe to a parallel exhaust pathway outside the exhaust pipe during engine operation, where the exhaust pathway includes rotatable plates coupled to a filtering material in a fixed housing;
 adjusting the engine operation via a controller based on a rotational speed of the plates, the rotational speed correlated to a soot load of the plates; and
 regenerating the plates in response to the rotational speed being greater than a threshold rotational speed.

2. The method of claim 1, wherein adjusting the engine operation is further based on a time interval between subsequent last and current regeneration events of the plates being less than a threshold time interval.

3. The method of claim 2, wherein the time interval is measured from an initiation of the last regeneration event to an initiation of the current regeneration event.

4. The method of claim 1, wherein the exhaust pipe is fluidly coupled to the exhaust pathway via an inlet pipe and an outlet pipe of the exhaust pathway, and where the inlet pipe comprises one or more perforations on a portion of the inlet pipe disposed inside an interior of the exhaust pipe.

5. The method of claim 1, further comprising flowing the exhaust gas through the fixed housing of the plates, an inlet of the fixed housing being located directly across an outlet of the fixed housing with the plates located therebetween.

6. The method of claim 1, wherein diverting the exhaust gas from the exhaust pipe to the exhaust pathway further includes flowing the exhaust gas through at least one plate of the plates in the fixed housing before returning the exhaust gas to an exhaust passage in the exhaust pipe.

7. The method of claim 1, wherein the plates are square and the filtering material is comprised of a particulate filter substrate configured to capture soot in an exhaust gas flow.

8. The method of claim 1, wherein the plates are porous.

9. A method, comprising:
 diverting a portion of exhaust gas from an exhaust pipe downstream of a particulate filter to a parallel exhaust pathway outside the exhaust pipe during engine operation, where the exhaust pathway includes rotatable plates coupled to a filtering material in a fixed housing;
 performing a regeneration of the plates in response to a rotational speed of the plates being greater than a threshold rotational speed;
 determining a time interval between when the regeneration was performed and when a last regeneration was performed; and
 adjusting the engine operation via a controller based on the time interval.

10. The method of claim 9, wherein adjusting the engine operation based on the time interval comprises indicating degradation of the particulate filter responsive to the time interval being less than a threshold time interval.

11. The method of claim 10, wherein adjusting the engine operation comprises adjusting one or more of torque output, spark timing, fuel injection timing, air/fuel ratio, and exhaust gas recirculation.

12. The method of claim 9, wherein the rotational speed is correlated to a soot load of the plates, and further comprising flowing remaining exhaust gas through the exhaust pipe in parallel with flow of the exhaust gas through the exhaust pathway.

13. A method, comprising:
 diverting exhaust gas from an exhaust pipe to a parallel exhaust pathway outside the exhaust pipe during engine operation, where the exhaust pathway includes rotatable plates coupled to a filtering material in a fixed housing; and
 adjusting the engine operation via a controller based on a rotational speed of the plates measured with a speed sensor, the rotational speed correlated to a soot load of the plates, the adjusting including adjusting one or more of torque output, spark timing, fuel injection timing, air/fuel ratio, and exhaust gas recirculation.

14. The method of claim 13, where the plates are regenerated in response to the rotational speed being greater than a threshold rotational speed.

15. The method of claim 13, wherein adjusting the engine operation is further based on a time interval between subsequent last and current regeneration events of the plates being less than a threshold time interval.

16. The method of claim 15, wherein the time interval is measured from an initiation of the last regeneration event to an initiation of the current regeneration event.

* * * * *